Patented Oct. 29, 1929

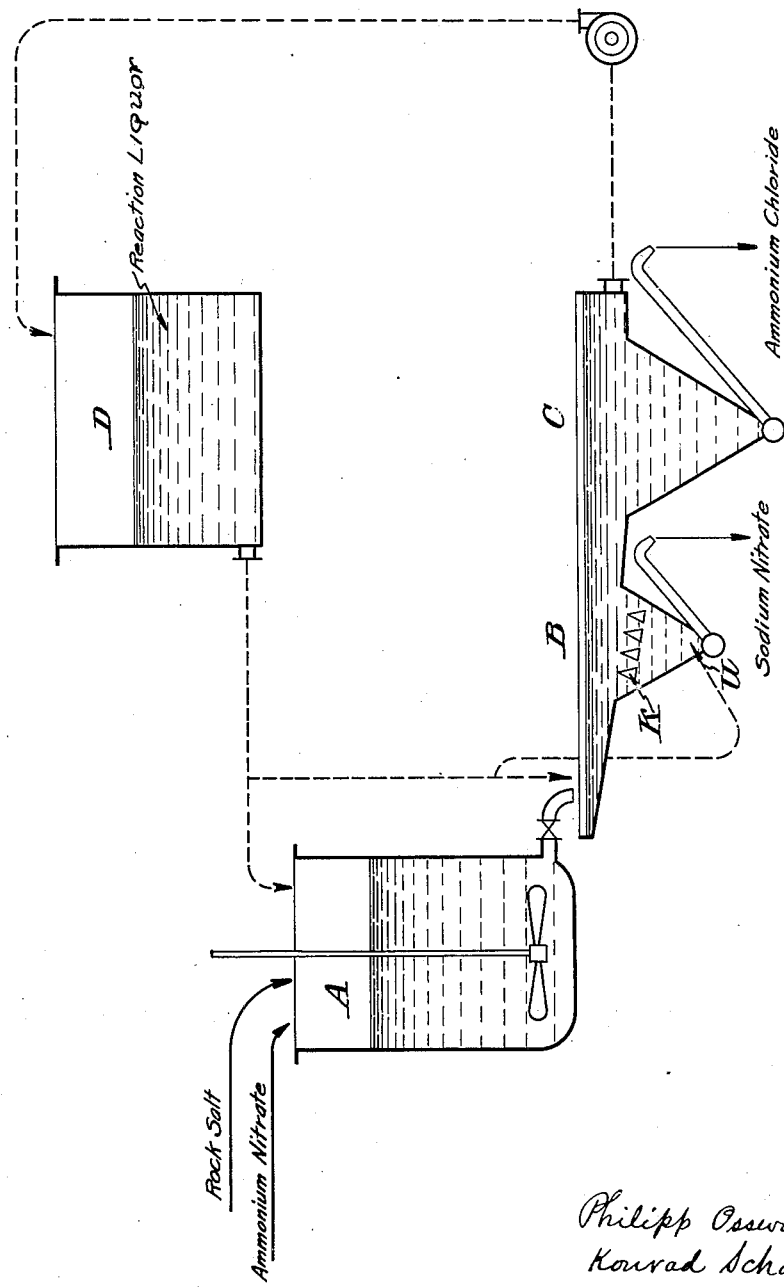

1,733,272

UNITED STATES PATENT OFFICE

PHILIPP OSSWALD, OF HOFHEIM-ON-THE-TAUNUS, AND KONRAD SCHAD, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY

PROCESS OF SEPARATING SOLID SALTS OF AMMONIUM AND OF THE ALKALIES OR ALKALINE EARTHS

Application filed October 19, 1925, Serial No. 63,554, and in Germany October 31, 1924.

The object of our invention is a new process for producing solid salts of ammonium and of the alkali metals or alkaline earth metals from mixtures thereof obtained by interaction, the characteristic feature of the invention consisting in subjecting said mixtures to an elutriating process.

Hitherto the general practice has been to separate by fractional crystallization the readily soluble salts of ammonium obtained by interaction from the salts of the alkali metals or alkali earth metals. By changing the temperature and adding solid or liquid precipitating agents the solubility of the salts could be influenced. The use of such methods is rather expensive, because it consumes a great deal of energy and material whilst the amount of the direct yield is very small and because it is necessary in most cases to increase these yields by working up a smaller or larger quantity of intermediate products.

The invention is based on the fact that almost all of the ammonium salts in contrast to the salts of the alkali metals or the alkaline earth metals possess a considerably lower specific weight and at the same time crystallize in a diffuse, for instance, in a feather-like form, whereby their ascent in the liquids used for the elutriating operation is promoted.

Hereafter we give a description of a manner in which our invention may be put into practice, taking, for example, the separation of sodium nitrate and ammonium chloride prepared from common salt and ammonium nitrate. The separation of such a mixture which is easily obtainable from common salt and ammonium nitrate, is of particular technical importance for the reason that, hitherto, the preparation of artificial sodium nitrate required the use of the costly sodium carbonate and, therefore, entailed great expenses. In our new process we use, instead of sodium carbonate, cheap common salt (rock salt or sea salt).

The following examples will illustrate more fully our invention and how it may be put into practice:

(1) From a storage vessel D are run into a vessel A—provided with a stirrer—2 cubic meters of the liquor used for the reaction which is agitated in a circle and comprising the following: 1000 kgm. of water, 773 kgm. of sodium nitrate, 272 kgm. of ammonium chloride, 912 kgm. of ammonium nitrate of a specific gravity of about 1,4. Into this liquor, which is kept at a temperature of about 35° C., are introduced within 2 hours 380 kgm. of finely powdered rock salt. After having added three quarters of the above stated quantity of common salt there are further added within one hour 520 kgm. of solid ammonium nitrate. The reaction being now complete, there are obtained about 900 kgm. of a salt mixture, suspended in mother liquor, comprising coarse-grained sodium nitrate, the grains being of a size of 0,5 to 1 mm. and of a density of about 2,3 and a fine-grained ammonium chloride the grains being of a size of about 0,02 mm. and of a density of about 1,5. This mixture is discharged into the elutriating apparatus B which is of the known type and which is advantageously fed with a reaction-liquor of a specific gravity of 1,4. In this apparatus the separation of the sodium nitrate takes place. The elutriating process may be facilitated by an undercurrent of liquor flowing in from $u$ and passing upward between wedge shaped grids $k$. The lighter ammonium chloride flows over into the settling tank C where it is isolated from the liquor; the latter being returned into the cycle of the process.

(2) Into a reaction liquor, composed of 1000 litres of water, 810 kgm. of sodium nitrate, 295 kgm. of ammonium chloride and 1445 kgm. of ammonium nitrate are introduced at 65° C. 250 kgm. of unground rock salt and 340 kgm. of ammonium nitrate. After about ½ hour, the dissolution, and, consequently, the conversion, is complete. By allowing the clear solution to cool, 500 to 600 kgm. of a crystalline mixture will be separated, consisting of coarse-grained sodium nitrate—size of grains above 1 mm.—and of ammonium chloride in a form resembling that of fine feathers; these two components can be easily isolated from each other by elutriation and possess a degree of purity of over 90% even if the adhering mother liquors are not removed therefrom.

In a manner analogous to that just described there may be prepared the two salts potassium nitrate and ammonium chloride, contained in the mixture obtained by the interaction of potassium chloride and ammonium nitrate. In this way a concentrated nitrogenous potassium manure can be obtained which will be particularly welcome to the farmer, in view of the fact that by using it he can save a good deal of expense connected with the transport, the storage and the strewing of this manure.

Our new process is also applicable to the interaction of ammonium sulfate and sodium chloride, whereby sodium sulfate and ammonium chloride are obtained.

If the salts, obtained by the above described process, are not yet sufficiently pure—which may be the case if they are to be used for some special purposes—the salts may be subjected to a further purifying process. We have found that the mother liquor saturated with the two salts produced as above described, when heated to a higher temperature, is capable of dissolving the impurities contained in the crude salts and consequently may be used for the said purpose. The fact that there is dissolved at the same time a small quantity of the salt to be purified, is of little importance. Thus, the crude salts obtained by the elutriating process are purified by washing them with the warmed mother liquor. This method offers the great advantage that thereby any further re-crystalizing—or evaporating operations are avoided. For instance, there my be heated from 25° to 40° C. 100 kgm. of sodium nitrate (about 90 per cent strength), obtained by the interaction of sodium chloride and ammonium nitrate, with 100 litres of the reaction liquor. After about ½ hour the adhering ammonium chloride together with some sodium nitrate is dissolved. There remain after the solution has been filtered by suction about 75 kgm. of sodium nitrate having a degree of purity of 97–98%.

We claim:

1. The process which consists in the steps of producing a mixture of a solid salt of ammonium and a solid salt of a metal of the alkali and alkaline earth metal series by double decomposition in solution in a liquid medium and then separating the two components of the mixture by means of an elutriating process at ordinary temperature.

2. The process which consists in the steps of producing a mixture of crystals of ammonium chloride and of potassium nitrate by double decomposition of ammonium nitrate and potassium chloride in solution in a liquid medium and then separating the two components of the mixture by means of an elutriating process at ordinary temperature.

In testimony whereof, we affix our signatures.

Dr. PHILIPP OSSWALD.
Dr. KONRAD SCHAD.